United States Patent [19]

Gonsiorowski et al.

[11] Patent Number: 4,737,621

[45] Date of Patent: Apr. 12, 1988

[54] INTEGRATED ADAPTIVE OPTICAL WAVEFRONT SENSING AND COMPENSATING SYSTEM

[75] Inventors: Thomas Gonsiorowski, Arlington; Julius Feinleib, Cambridge; Peter F. Cone, Bedford; Andrew J. Jankevics, Watertown; Kelsey S. Nikerson, Arlington; Lawrence E. Schmutz; Anthony Vidmar, both of Watertown; Allan Wirth, Bedford, all of Mass.

[73] Assignee: Adaptive Optics Assoc., Inc., Cambridge, Mass.

[21] Appl. No.: 806,083

[22] Filed: Dec. 6, 1985

[51] Int. Cl.[4] ................................................ G01J 1/20
[52] U.S. Cl. .................................... 250/201; 350/360
[58] Field of Search ............... 356/141, 152; 250/201; 350/360, 167, 500

[56] References Cited

U.S. PATENT DOCUMENTS

| | | | |
|---|---|---|---|
| 3,731,103 | 5/1973 | O'Meara | 250/199 |
| 3,861,801 | 1/1975 | Peters et al. | 356/121 |
| 3,904,274 | 9/1975 | Feinleib et al. | 350/360 |
| 3,923,400 | 12/1975 | Hardy | 356/353 |
| 3,975,629 | 8/1976 | O'Meara | 250/201 |
| 3,979,585 | 9/1976 | O'Meara | 250/201 |
| 3,980,879 | 9/1976 | O'Meara | 250/201 |
| 3,988,608 | 10/1976 | O'Meara | 250/201 |
| 4,016,415 | 4/1977 | O'Meara | 250/201 |
| 4,141,652 | 2/1979 | Feinleib | 356/121 |
| 4,248,504 | 2/1981 | Albertinetti et al. | 350/360 |
| 4,399,356 | 8/1983 | Feinleib et al. | 250/201 |
| 4,472,029 | 9/1984 | Hardy | 350/360 |

OTHER PUBLICATIONS

Hardy, J. W. et al., (Mar. 1977), "Real-Time Atmospheric Compensation", *J. Opt. Soc. Am.*, vol. 67, No. 3, pp. 360–369.

Schmutz, L. E. et al., (1979), *SPIE vol. 179 Adaptive Optical*, Components II, pp. 75–80.

Beaver et al., (Sep. 1971), "A Digital Multichannel Photometer", *The Review of Scientific Instruments*, vol. 42, No. 9.

Tull et al., (May 1975), "Self-Scanned Digicon: A Digital Image Tube for Astronomical Spectroscopy", *Applied Optics*, vol. 14, No. 5.

Grosso et al., (Mar. 1977), "The Membrane Mirror as an Adaptive Optical Element", *J. Opt. Soc. Am.*, vol. 67, No. 3.

*Primary Examiner*—Edward P. Westin
*Assistant Examiner*—Charles F. Wieland

[57] ABSTRACT

A wavefront sensing and compensating system for detecting and correcting for distortion in light wavefronts is described in which the wavefront is divided into a plurality of subapertures and light intensified and imaged as spots of light from each subaperture onto a detector array. The individual detector elements of the array form a plurality of electrical signals proportional to the local divergence of the vector gradient field ($\nabla^2 \phi$). This $\nabla^2 \phi$ signal after interfacing or reconstruction is applied to corrective mirrors which may be of the deformable or membrane type.

13 Claims, 6 Drawing Sheets

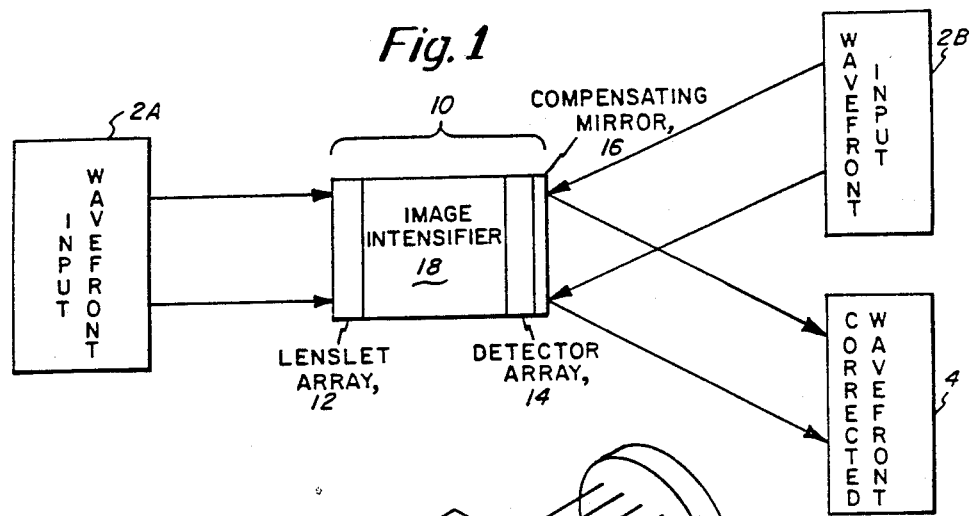
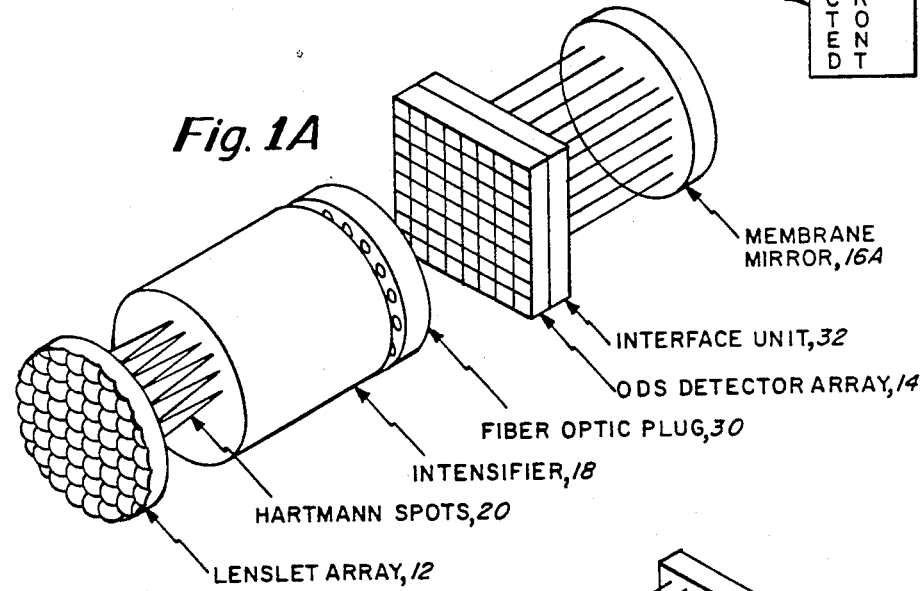
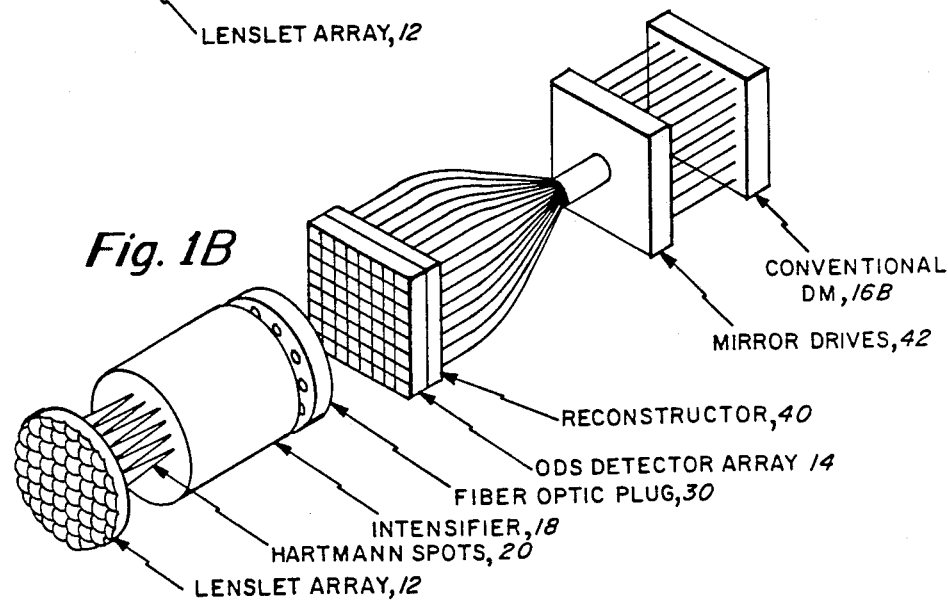

INTEGRATED ADAPTIVE OPTICAL WAVEFRONT SENSING AND COMPENSATING SYSTEM

TECHNICAL FIELD

This invention is in the field of adaptive optics systems and more particularly relates to apparatus for sensing and correcting wavefront distortions in a beam of light.

BACKGROUND ART

Adaptive optics systems have been devised to improve image resolution by correcting for distortions induced in light wavefronts by atmospheric disturbances and the imperfections of the receiving optical systems. These adaptive optics systems are either outgoing wave modulated systems or return wavefront measurement systems.

Essential elements of such adaptive optics systems is the wavefront sensor which senses wavefront distortion and the wavefront compensator which corrects the wavefront in response to the sensor.

A phase sensitive type of wavefront sensor is the so-called shearing interferometer described by Hardy et al. in "Real-time Atmospheric Compensation", *J. Opt. Soc. Amer.* 67, 360, 1977. In this type of system, the input wavefront is interfered with by a laterally displaced, or sheared, replica of itself. The shear is provided by a set of rotating transmissive gratings, using the interference between the zero (unsheared) and the ±1 (sheared) diffraction orders.

The information provided by the shearing interferometer of Hardy et al. is a set of local phase differences between points in the pupil plane separated by the shear distance. By measuring these phase differences in two dimensions using a set of x and y detector arrays, the full pupil can be sampled and the input wavefront approximately calculated.

A drawback of this system is that it uniquely determines phase differences only to within one wave of tilt between points in the pupil plane separated by the shear distance. Larger tilts are detected as having values less than a full wave. This results in a "so-called" two-pi ambiguity. This ambiguity is due to the periodic nature of the amplitude differences produced by phase differences in the two interfering wavefronts. The two-pi ambiguity limits the dynamic range of the shearing interferometer as a wavefront sensor. Phase differences larger than one wave between adjacent subapertures can not be correctly sensed.

Another type of wavefront sensor is the Hartmann-type sensor described in "Integrated Imaging Irradiance ($I^3$) Sensor, A New Method For Real-Time Wavefront Mensuration", *SPIE Vol. 179 Adaptive Optical Components II*, (1979) p. 27. In the Hartmann-type sensor, the pupil is divided into subapertures which are each imaged onto an x-y position sensor. The displacement of each spot from its center position yields the average wavefront tilt at its respective subaperture. Such an arrangement allows the measurement of many waves of tilt without ambiguity.

An improvement in the Hartmann sensor is described in U.S. patent application Ser. No. 736,933 filed May 22, 1985 which uses an analog filter array to encode a function of light spot intensity distribution onto the intensity of an image intensified beam of light divided into subapertures and passed through the filter array. This greatly simplifies the centroid calculations needed in prior art Hartmann-type sensors, since pixel weight multiplication is accomplished in an analog fashion by the filter array.

In U.S. Pat. No. 4,472,029 issued to Hardy on Sept. 18, 1984, the Hartmann-type wavefront sensor is integrated with a wavefront compensator. In Hardy's integrated wavefront compensator an input wavefront is divided into a plurality of subaperture images. The subaperture images are transformed by an image intensifier into a corresponding imaged photoelectron charge pattern. The local fields established by the charge pattern are capacitively sensed and a signal proportional to the displacement or changes of the charge locations of the pattern is used to actuate nodes on an active peizoelectric mirror (shown in Feinleib et al. U.S. Pat. No. 3,904,274 issued Sept. 9, 1975) to compensate the input wavefront incident on the mirror surface.

Hardy '029 at column 5 lines 20-35 refers to an earlier Hardy et al. U.S. Pat. No. 3,923,400 and the need to sum the phase differences produced at the nodes. Hardy et al. '400, uses a resistive network for summing while Hardy '029 uses a conductive layer. The conductive layer integrates the phase differences to produce the requisite phase signal to apply to the compensating mirror.

In shearing interferometer and Hartmann-type wavefront sensors, the optical output of the wavefront sensor is processed to yield the tip and tilt of the wavefront at measurement points associated with each subaperture. In both cases, phase differences between adjacent points on the wavefront are measured.

DISCLOSURE OF THE INVENTION

The present invention relates to an integrated wavefront sensor/compensator of the Hartmann type wherein the wavefront beam is divided into subaperture images or spots which are intensified and focused onto an array of detectors. The detectors are unique in that they are arranged in a manner to convert the optical spot image displacements from each subaperture to electrical currents proportional to the local divergence or Laplacian ($\nabla^2\phi$) of the gradient field of the distorted wavefront phase $\nabla\phi$.

The detectors in this array are arranged contiguous with another with the sensing surfaces forming a planar array in the focal plane. The detectors are positioned such that with zero phase distortion of the original wavefront, i.e., null position, each spot is centrally located at the juncture between four adjacent detector elements and the center to center spacing between adjacent detector elements is equal to the center to center spacing between adjacent spots. Assuming uniform spot intensity, the outputs of each of the detector elements is a current signal proportional to the divergence of $\nabla^2\phi$ the gradient $\nabla^2\phi$ of the phase of the wavefront in the pupil plane.

Preferably, a Digicon-type device as described in E. A. Beaver and C. E. McIlwan, "A Digital Multichannel Photometer", *The Review of Scientific Instruments*, Vol. 42, No. 9, pp. 1321-1324, Sept. 1971, and R. G. Tull et al., "Self-Scanned Digicon: A Digital Image Tube for Astronomical Spectroscopy", *Applied Optics*, Vol. 14, No. 5, May 1975, is used for image intensification and detection. In this device, photoelectrons from a photocathode of an image intensifier tube are accelerated and imaged onto an anode comprising an array of silicon diodes. Separate output electrodes are coupled to each discrete diode so that the current from each detector is proportional to the photon flux in the corresponding part of the incident photon image.

With a membrane-type compensating mirror, this divergence current signal is converted to a voltage signal which may be applied directly to electrostatic electrodes adjacent the membrane to drive the membrane mirror with an electrostatic charge. In this embodiment, reconstruction or integration of the detector output signals is not required to produce a driving signal since the membrane itself performs the requisite integration.

Alternatively, a deformable mirror may be used for wavefront compensation. In this embodiment, the output divergence currents from the detector array are coupled to a resistive reconstructor wherein voltages proportional to the gradient of the optical phase are obtained. These gradient signals are then coupled to the deformable mirror to compensate wavefront distortion.

BRIEF DESCRIPTION OF THE DRAWINGS

FIG. 1 is a schematic drawing of an integrated wavefront compensator according to this invention.

FIG. 1A is a schematic perspective view of a membrane mirror ODS wavefront sensor/compensator embodiment of the invention.

FIG. 1B is a schematic perspective view of a deformable mirror ODS wavefront sensor/compensator embodiment of the invention.

BEST MODE OF CARRYING OUT THE INVENTION

I. System Description

Figure 2A:
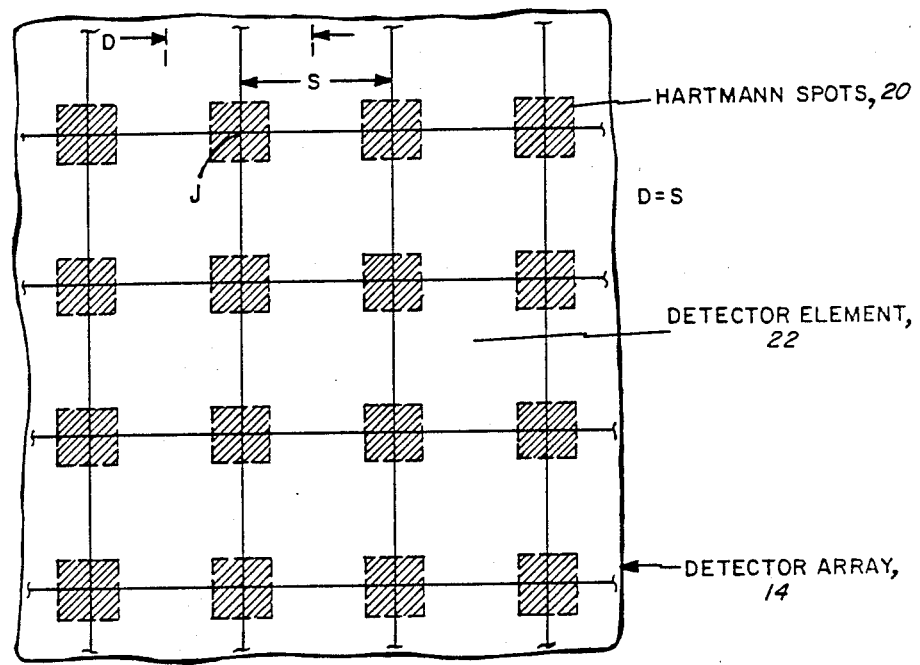
FIG. 2A is a schematic representation of a portion of a detector array 14 in accordance with the invention.

Preferred embodiments of the invention will now be described in connection with the drawings. Referring to FIG. 1, there is illustrated, in opto-electric block diagram form, a wavefront sensor-corrector system incorporating an integrated optical divergence sensor (ODS) 10 comprising, in general, a lenslet array 12, an image intensifier 18 and a detector array 14.

The purpose of the system is to phase compensate images from an input wavefront for phase distortion arising, for example, from random atmospheric turbulence superimposed on a propagated wavefront.

An input wavefront 2A is imaged by suitable optics onto the image plane of lenslet array 12 disposed on one side of ODS 10. Concurrently, the input wavefront is beam split and imaged, as input wavefront 2B, onto compensating mirror 16 disposed at an opposite side of ODS 10 adjacent detector array 14.

The lenslet array 12 divides the input wavefront beam into a plurality of subaperture light beams or spots. The light intensity of each light spot is amplified by image intensifier 18 and the phosphor screen output of the image intensifier tube is coupled, such as by fiber optic plugs 30 (See FIGS. 1A or 1B) to ODS detector array 14.

II. Detector Array Configuration

Figure 3:
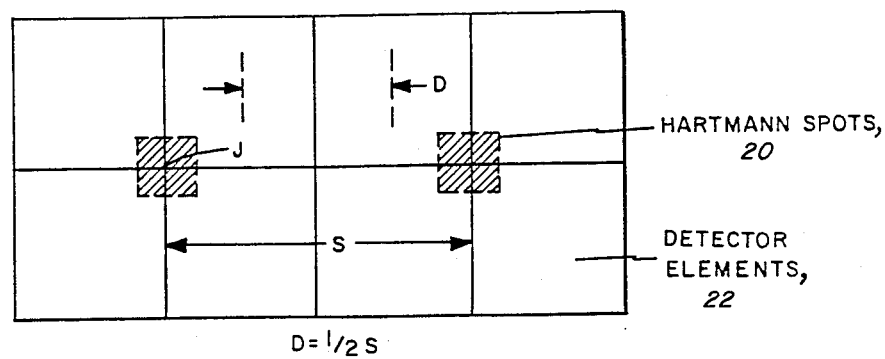
FIG. 3 is an enlarged portion of a prior art detector array.

As shown in detail in FIG. 2A, detector array 14 comprises an array of light detectors 22 aligned with the focused image intensified subaperture spots 20 such that center-to-center spacing "D" of the detector elements is equal to the center to center spacing "S" of the spots and the null, or zero phase distortion position of each spot 20 is located at the junction "J" between four adjacent detector elements. The foregoing arrangement of detector alignment and spacing is in distinct contrast to the prior art arrangements, as shown in FIG. 3, and described in U.S. Pat. No. 4,141,652. In such prior art structures the zero positions of the subaperture spots are located at the juncture "J" between four adjacent detector elements as in the present invention. However, in the prior art, the center to center spacing "D" of the detector elements is one half of the spacing "S" between spots.

Therefore, in the present invention, the output current from each detector element is proportional to the light intensity received from portions of four Hartmann spots whose null positions are located at the respective four corners of one detector. In the prior art detector no such spot overlap occurs and four detectors combine as a quad cell in which the combined detector output current is related to the deviation of a single Hartmann spot from the null point at the center of the quad cell.

Referring back to FIG. 2A, detector elements 22 may comprise discrete PIN diode devices which convert the total light intensity falling on the sensing surface of the detector element to a proportional electrical output current.

Assume, for simplicity, that the spots 20 are uniformly illuminated rectangles, all of the same brightness. Then, the amount of light falling on a detector element 22 from a given spot 20 is directly proportional to the area of that part of the spot that intersects the detector element. With the spots all at their null positions (as shown) the output from each detector will be a constant $I_o$.

Figure 2B:
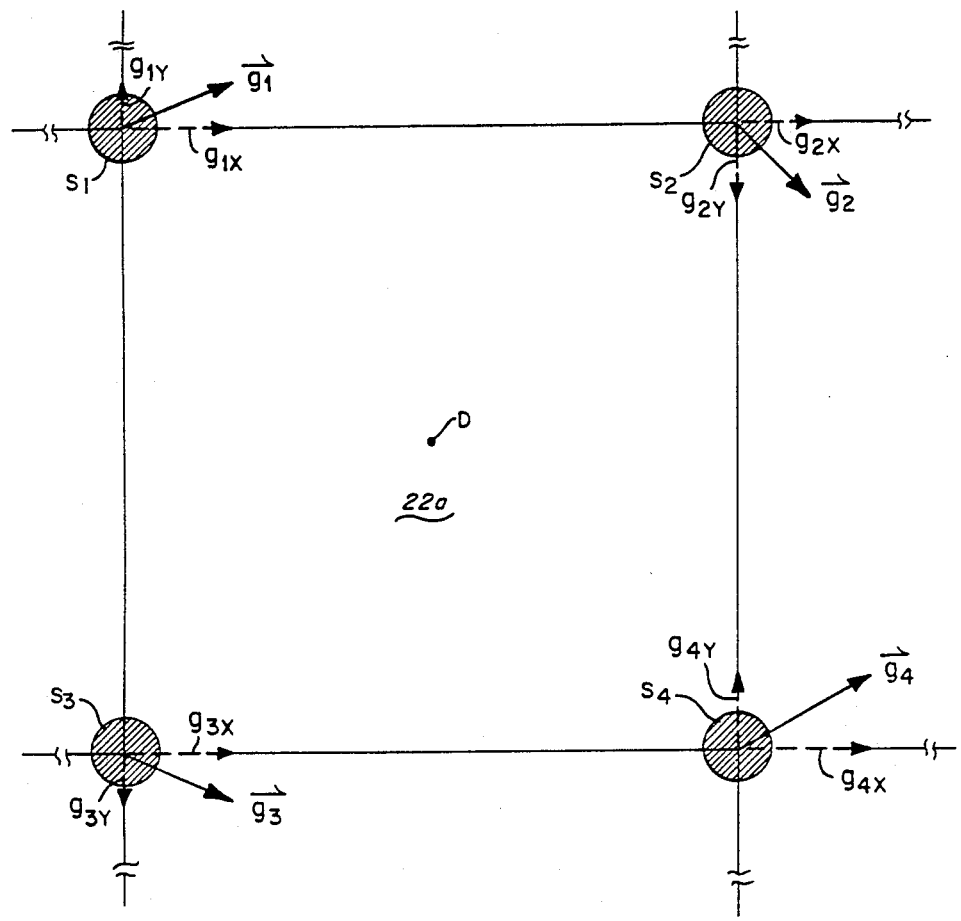
FIG. 2B is an enlarged portion of FIG. 2A.

If the four spots $S_1$, $S_2$, $S_3$ and $S_4$ on a given detector element 22($a$) have displacements (as shown in FIG. 2B) then the output of the detector element 22($a$) is given by:

$$I_n - I_o = k''\ (g_{1x} - g_{2x} + g_{3x} - g_{4x} + g_{2y} - g_{1y} + g_{4y} - g_{2y})\ \text{Equation}$$

wherein:

$I_n$ equals the variable current output from the detector element arising from then spot displacements;

$I_o$ equals a constant null current;

$k''$ is a constant;

$g_{1x} \ldots g_{4y}$ are the x— components of the spot displacements; and $g_{1y} \ldots g_{4y}$ are the y- components of the spot displacements.

This output current $I_n - I_o$ from each element represents the local divergence ($\nabla^2\phi$) vector field of the gradients of the phase ($\nabla\phi$) of the input wavefront.

III. Membrane Mirror Embodiment

Figure 6:
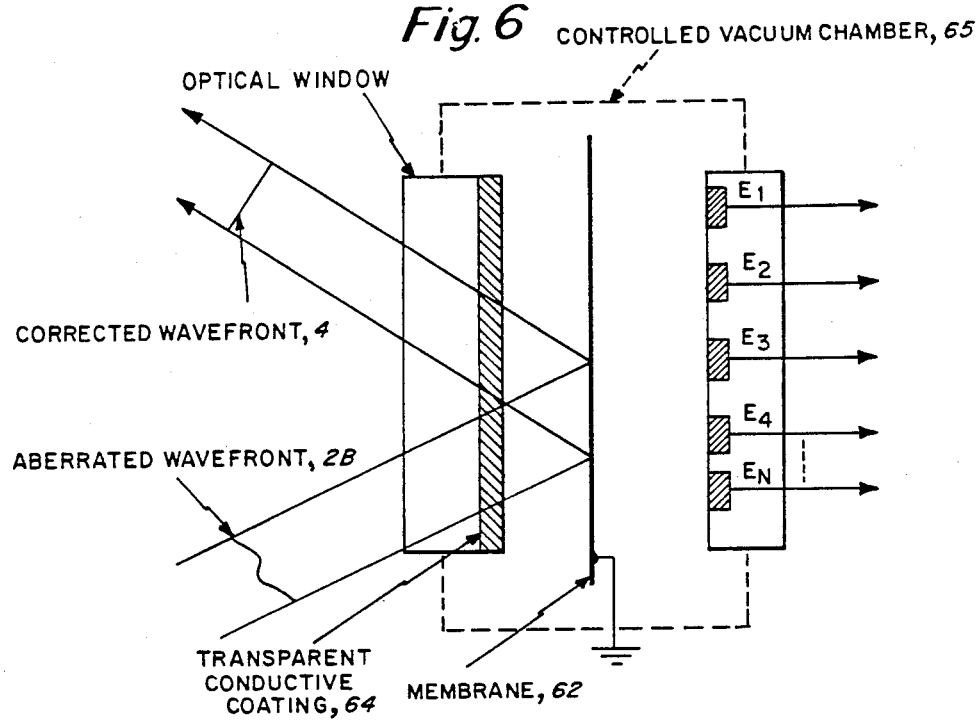
FIG. 6 is a schematic drawing showing the details of the membrane mirror construction.

A membrane mirror, as used in the wavefront correction system of the invention, is shown in FIG. 6. It consists of a thin deformable membrane 62, typically about one micrometer thick, stretched over an optically flat ring (not shown) and centered between an array of electrodes $E_1 - E_n$ and an optically transparent conductive electrode 64. The entire assembly is contained in a controlled pressure chamber 65. The separation between the electrostatic electrodes and the conductive transparent electrode is a few tens of micrometers. The membrane 62 is comprised of a thin metal film; or a polymer film which is metalized to obtain high electrical conductivity and optical reflection.

In operation the electrostatic electrodes $E_1 - E_n$ and the transparent conductive electrode 64 are biased to the same voltage (75 V-100 V) with the membrane 62 grounded. Consequently, the membrane at null position remains optically flat due to the electrical restoring forces and the mechanical tension. By changing the voltage applied to the electrostatic electrodes $E_1 - E_n$ the membrane can be deflected. Typically voltage changes of $+/-50V$ are adequate for correcting aberrated optical beams in adaptive optical systems.

Referring now to the membrane mirror ODS embodiment shown in FIG. 1A, the lenslet array 12, intensifier 18, fiber optic plug 30 and detector array 14 are as previously described. However, in the membrane mirror embodiment, the current signals from the detector array 14 are coupled to an interface unit 32 which converts the output currents to appropriate voltage signals before applying them the drive electrodes ($E_1 - E_n$ of FIG. of the membrane 16A.

Figure 4:
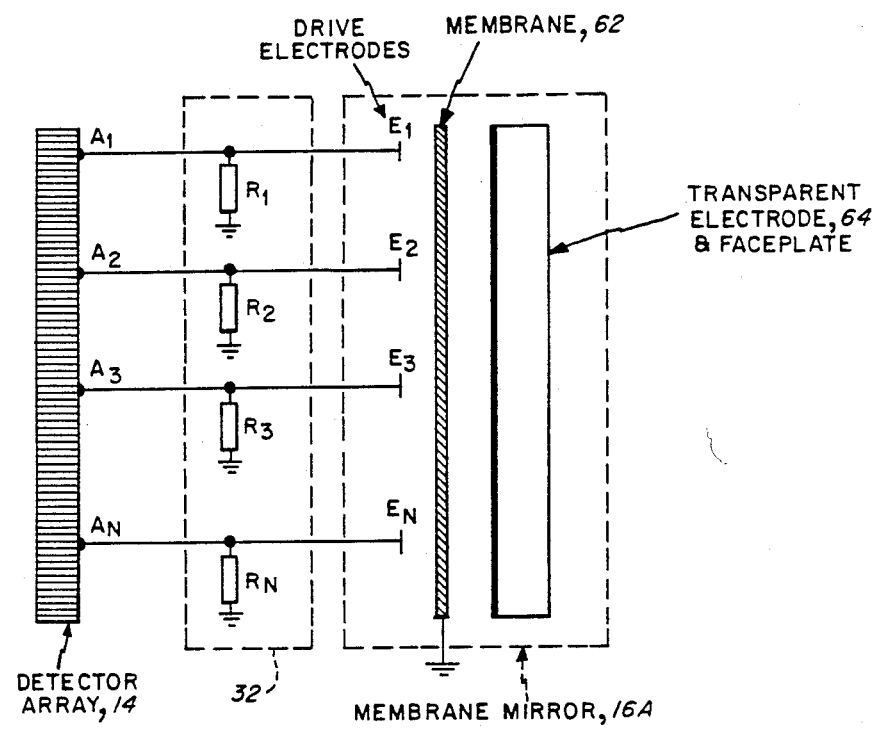
FIG. 4 is a schematic drawing showing the interface circuit for the membrane mirror embodiment of the invention.

From Gross and Yellin, R. P. Grosso and M. Yellin, "The Membrane Mirror as an Adaptive Optical Element", i J. Opt. Soc. Am., vol. 67, No. 3, pp. 399-406, Mar. 1977, the displacement caused by electrostatic deflection at a given point z(x,y) on a membrane mirror is given by:

$$\nabla^2 Z(x,y) = kf(x,y) \qquad \text{Equation 2}$$

where:

$\nabla^2 Z(x,y)$ is the Laplacian of the membrane displacement; k is a constant of proportionality; and f(x,y) is the applied electrostatic force. From this equation, if the force applied to the membrane is the divergence of the vector field of tips and tilts, i.e $\nabla^2\phi$ the shape assumed by the membrane will be the desired phase map. In accordance with the present invention therefore, the interface unit 32, as shown in more detail in FIG. 4, converts the current outputs of detector array 14 to voltage signals to be applied to the driving electrodes of the membrane mirtor 16A by passing the current through bias or load resistors $R-R_n$.

It should be noted that the output current of each detector site (and hence the voltage at each drive electrode) is not zero when the spots are all at their null positions. This is not a problem with the membrane mirror since normal operation requires a bias voltage in the null position of the mirror. Thus this null current (voltage) can be accommodated by suitably adjusting the bias voltage.

IV. Deformable Mirror Embodiment

Figure 5:
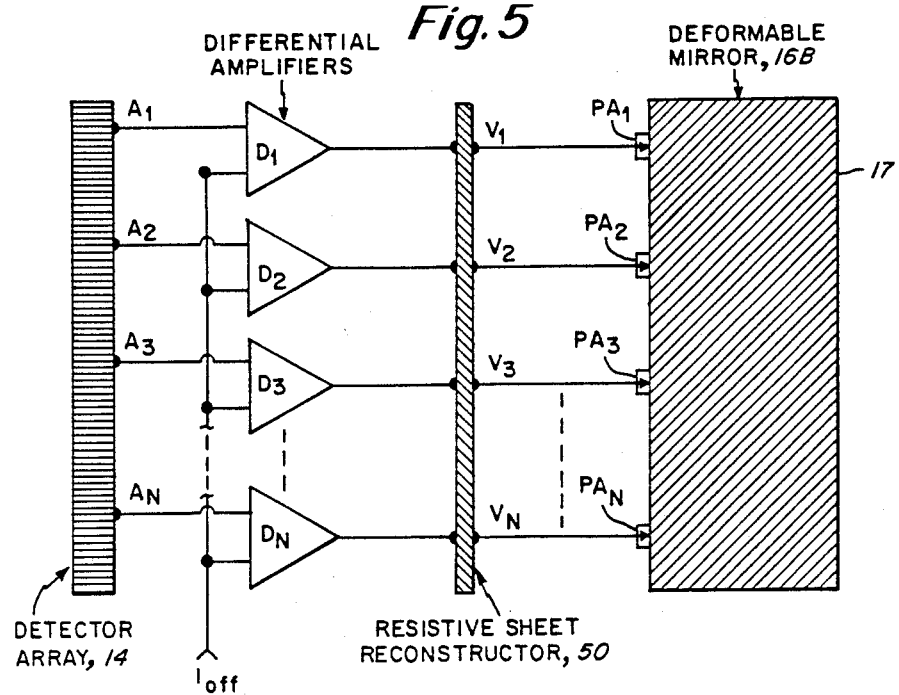
FIG. 5 is a schematic drawing showing the interface circuit for the deformable mirror embodiment of the invention.

A deformable mirror embodiment is shown in FIG. 5 and FIG. 1B. The deformable mirror consists of a thin bendable, reflective plate 17 which is bonded to an array of piezoelectric actuators $PA_1-PA_n$ which can push and pull the plate to deform it from its normally flat position. The plate bends as the result of a changing voltage $V_1-V_n$ applied to the piezoelectric actuators $PA_1-PA_n$ from resistive sheet reconstructor 50 which changes the length of the actuators. The deflection of plate 17 is proportional to the change in applied voltage. The actuators require voltages of the order of 100 V to obtain deflections typical of adaptive optics requirements Since the mirror surface deformations are proportional to the applied voltage, the driving signal needed for adaptive optical correction is a voltage proportional to the phase of the optical wavefront. To obtain this signal from the ODS sensor of the present invention requires the inclusion of a reconstructor circuit.

As shown in FIG. 1B, Hartmann spots 20 are formed by the lenslet array 12 on the intensifier 18. The intensified spots are coupled by fiber optic plug 30 onto detector array 14. The output current signals from the detector array pass through a reconstructor 40 which generates the appropriate signals for the mirror drive 42 which drives the deformable mirror 16B.

Comparing this deformable mirror embodiment to the membrane mirror embodiment it may be seen that the essential difference is the necessity of a reconstructor network in the deformable mirror embodiment. This arises because of the different drive signals required by the two mirrors. Whereas the membrane mirror is appropriately driven by the Laplacian of the phase, $\nabla^2\phi$, the conventional deformable mirror requires the phase, $\phi$, itself as the drive signal. The appropriate reconstruction can be performed by the single continuous resistive sheet 50 of FIG. 5. For such a sheet, the voltage at any point satisfies the equation:

$$\nabla^2 V(x,y) = CI(x,y) \qquad \text{Equation 3}$$

where I(x,y) is the net current flowing into the sheet and C is a constant of proportionality. Since the current signal input to such a resistive sheet is proportional to the Laplacian of the phase the output voltage will in fact be proportional to the phase itself.

Unlike the membrane mirror embodiment, the non-zero null current does present a problem if the ODS detector is to drive a resistive reconstructor/deformable mirror. Two solutions to this problem are disclosed herein. First as shown in FIG. 5, the outputs of each detector site $A_1-A_n$ are connected to separate differential amplifiers $D_1-D_n$ the other input of which is adjusted to the mean null current, $I_{off}$. The output of each differential amplifier is then connected to the nodes of the resistive sheet reconstructor 50. These nodes will then assume the correct voltages $V_1-V_n$ needed to drive the deformable mirror 16B.

Figure 7:
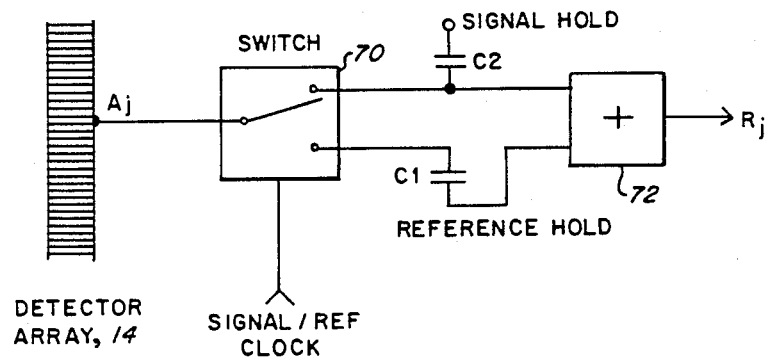
FIG. 7 is a schematic of a sample-hold circuit for the embodiment of FIG. 5.

The second solution, as shown in FIG. 7, utilizes a sample and hold circuit to record the signal generated by a reference wavefront (i.e. the null current). Each of the detector array outputs $A_j$ asses through a switch 70 which is clocked such that during a reference cycle the output current flows into the capacitor C2 and during the measurement cycle this current flows into capacitor C1. These capacitors are connected to a summing circuit 72 which generates the necessary current for the reconstructor node, $R_j$. This method has the advantage that the null current is measured separately for each detector so that pixel-to-pixel variations are compensated.

V. Alternate Spot Mapping Embodiments

One technique for imaging or mapping the Hartmann spots on the detector array 22 is shown in FIG. 2A. In FIG. 2A, one quarter of each of four Hartmann spots 20 falls on each detector element 22. The discrete detector elements or cells produce the proper sums of differences of spot displacements to yield the interpolated numerical divergence of the gradient field.

Figure 8:
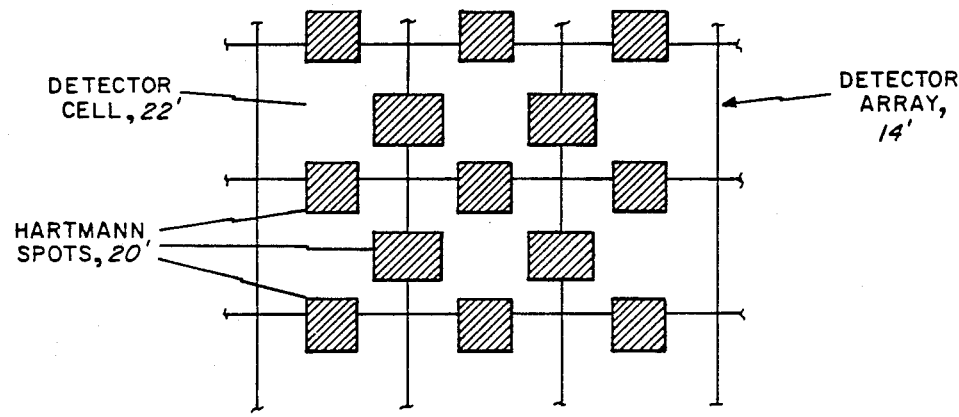
FIG. 8 is a schematic of an alternate mapping technique for the detector array 14'.
Figure 9:
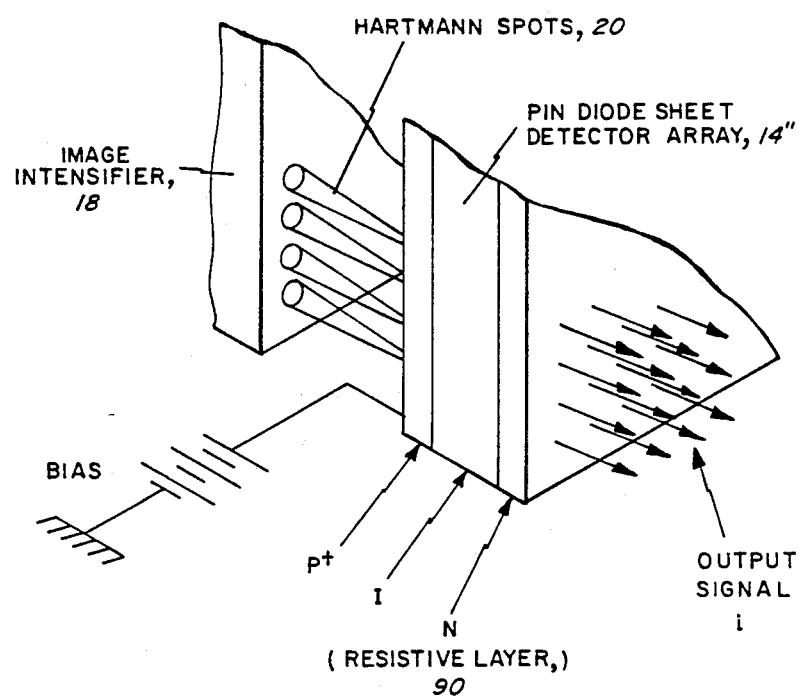
FIG. 9 is a partial perspective of a resistive sheet output ODS detector array 14''.

In the alternate embodiment shown in FIG. 8, there are twice as many spots 20' as detector elements 22' and the null position of each spot is located half-way between the intersection of four adjacent elements. Each detector cell intercepts one-half of four spots for a total equal to two spot areas of intensity. The net flux of light onto a cell in each mapping is the same and, in the photon statistics limit, the signal-to-noise ratio in the output signals is also the same. The difference between the two mapping techniques, lies in the way the tips and tilts are sampled. In the arrangement of FIG. 8A, the output from each detector is sensitive to only the X-component of two spots and only the Y-component of the other two spots. In contrast, the system of FIG. 2A uses all the information encoded in the spot displacements. The FIG. 8 system has the disadvantage that the output is not truly the divergence for large spot displacements. The X-displacement sensitivity of the output of the detector elements in FIG. 8 depends upon the value of the Y displacement and conversely. This X-Y crosstalk is a second order effect and may be made arbitrarily small by enlarging the spot size. Spot enlargement is one of the benefits derived from intensifying the Hartmann spot pattern prior to imaging on the detector array.

VI. Non-Uniform Illumination Embodiment

In the foregoing embodiments, it has been assumed that the spots falling on detector array 14 (see FIG. 2A) must be uniformly illuminated. This restriction may be avoided by operating the image intensifier in such fashion that its amplification is saturated by the lowest intensity Hartmann spot 20 (see FIG. 1A). This results in all intensified spots having the same illumination level at detector array 14.

Equivalents

This completes the description of the preferred embodiments of the invention. Those skilled in the art may recognize other equivalent embodiments to those described herein; which equivalents are intended to be encompassed by the claims, as follows:

We claim:

1. An optical wavefront sensor and compensator system for detecting wavefront phase distortions in a beam of light and correcting for such distortions comprising:
   (a) beam divider means for dividing said beam of light into a plurality of subaperture light spots in a predetermined array of rows of spots;
   (b) detector array means comprising a plurality of detector array element means each such detector array element means converting the sum of the light intensity of any portions of the light spots imaged onto each said element means to any array element signal corresponding to said sum of the light intensity, said detector array element means disposed such that, in the null position of the subaperture light spots, the light spots from each subaperture are imaged onto the intersection between at least two adjacent array element means and the center to center spacing between adjacent detector elements is substantially equal to the center to center spring between adjacent subaperture light spots within a row of spots, whereby each of said detector array element means responds to light from at least two subapertures such that phase distortions of said wavefront cause corresponding changes in said array element signal produced by each detector array element means;
   (c) compensating means responsive to said array element signal from each array element means for compensating the phase of the wavefront in accordance with said array element signal.

2. The system of claim 1 wherein each of said array element signals from the detector array element means is porportional to the divergence of the vector gradient of the wavefront at the location of the detector array wherein said detector element means is located.

3. The system of claim 2 wherein the compensating means comprises a reflective membrane with an electrode array of electrostatic electrodes adjacent thereto and the array element signals are applied to corresponding electrodes of said electrode array of said electrodes adjacent said membrane, whereby said reflective membrane forms a surface compensating the phase distortions detected by said detector array means.

4. The sensor of claim 2 wherein the signals from each detector means are integrated before being applied to the compensating means which comprises a deformable mirror.

5. The sensor of claim 1 wherein the detector array comprises a plurality of photodiodes forming said detector element means.

6. The sensor of claim 1 wherein the light spots are image intensified prior to being detected.

7. The sensor of claim 6 wherein the image intensifier is a digicon device having a phtocathode and an anode comprising an array of phtodiodes.

8. A system according to claim 2, further characterized in that said rows of spots are arranged in a rectangular array of rows and columns and said detector array means is arranged with said detector array elements positioned and sized such that each of said subaperture light spots intercepts four detector array elements in said null position, whereby each detector element signal within the interior of said detector array is responsive to light from four subaperture light spots to form said array element signal representative of the divergence of the vector gradient of the field over the area of said detector array element.

9. A system according to claim 8, in which:
   an image intensifier device is interposed between said beam divider means, with an intensifier input plane disposed to intercept said plurality of subaperture light spots and said detector array means is disposed in alignment with an output surface of said image intensifier device.

10. A system according to claim 9, in which said image intensifier means is merged with said detector array in a digicon device.

11. A system according to claim 2, in which said rows of spots are arranged in an overlapping pattern such that adjacent rows are offset with respect to one another by half the interspot distance between adjacent spots within a row; and said detetor array elements are sized and positioned such that each spot intercepts two detector array elements and each detector arry element signal within the interior of said detector array means is responsive to light from four subaperture light spots to form said array element signal representative of the divergence of the vector gradient of the field over the area of said detector array element.

12. A system according to claim 11, in which:
an image intensifier device is interposed between said beam divider means, with an intensifier input plane disposed to intercept said plurality of subaperture light spots and said detector array means is disposed in alignment with an output surface of said image intensifier device.

13. A system according to claim 1, in which said image intensifier means is merged with said detector array in a digicon device.

* * * * *